United States Patent [19]

Harp

[11] Patent Number: 4,877,637

[45] Date of Patent: Oct. 31, 1989

[54] METHOD OF TREATING SOYBEANS

[76] Inventor: Emogene Harp, R. R. 1, Box 99, Marienthal, Kans. 67863

[21] Appl. No.: 203,898

[22] Filed: Jun. 8, 1988

[51] Int. Cl.$^4$ ................................................ A23L 1/20
[52] U.S. Cl. .................................... 426/634; 426/438; 426/660
[58] Field of Search ................. 426/634, 438, 93, 302, 426/660

[56] References Cited

U.S. PATENT DOCUMENTS 2,329,080 12/1939 Raymond ............................ 426/634

FOREIGN PATENT DOCUMENTS 1453438 10/1976 United Kingdom ................ 426/634

Primary Examiner—Donald E. Czaja
Assistant Examiner—Celine T. Callahan
Attorney, Agent, or Firm—John W. Carpenter

[57] ABSTRACT

A method for producing an edible soy nut confection comprising soaking soybeans in water, drying the soaked soybeans, freezing the dried soybeans, and frying the frozen dried soybeans in hot soy oil until the moisture leaves the soybeans.

17 Claims, No Drawings

METHOD OF TREATING SOYBEANS

FIELD OF THE INVENTION

This invention is related to an improved process for producing edibles or confections. More specifically, this invention provides an improved process for rendering soybeans edible and tastier.

DESCRIPTION OF THE PRIOR ART

A patentability investigation was conducted and the following patents were discovered: U.S. Pat. No. 2,329,080 to Raymond; U.S. Pat. No. 3,063,843 to Hashimoto; U.S. Pat. No. 3,911,142 to Huelskamp et al.; U.S. Pat. No. 4,140,803 to Panchuk et al.; U.S. Pat. No. 4,499,113 to Mochizuki et al.; and U.S. Pat. No. 4,663,175 to Werner et al. None of the foregoing prior art patents teach or suggest the particular improved process of producing a more tasty soybean.

SUMMARY OF THE INVENTION

The present invention accomplishes its desired objects by broadly a process for preparing edible, more tasty soybeans while simultaneously making the soybeans palatable and readily digestible, comprising the steps of:

(a) washing soybeans repeatedly until water and soybeans are free of any foreign matter;

(b) soaking soybeans in water, preferably for at least 4 hours;

(c) removing the soaked soybeans from the water;

(d) drying the removed soybeans, preferably air drying in air at room temperature for at least 4 hours, preferably 8 to 10 hours;

(e) freezing the dried soybeans;

(f) frying the frozen soybeans in a hot oil bath, preferably soybean oil or other polyunsaturated vegetable oils having a temperature of about 375° F.; and (g) removing the fried soybeans for cooling and draining of excess oil from the fried soybeans.

The produced soy nut is tastier than soy nuts produced conventionally, and may be employed to produce other confections, such as popcorn products, chocolate products, soy brittle, etc. Alternatively, the produced soybean may be seasoned while still hot with seasoned salt to produce soy nuts that are palatable, tasty, crisp and crunchy.

Therefore, it is an object of the present invention to provide an improved process whereby the inherent soy oil in soybeans is removed so that the produced soy nut is free of saturated oil, is readily digestible, and is tastier than soy nuts produced by conventional methods. The advantage of the soy nut being free of saturated fat is that saturated fat will raise blood cholesterol levels when consumed.

It is another object of the present invention to provide a palatable and digestible soy nut product from a soybean wherein any undesirable properties of the soybean have been removed while producing a soy nut having a crisp or crunchy condition.

It is a further object of the present invention to provide an improved process for producing confections from soy nuts.

These, together with the various ancillary objects and features which will become apparent to those skilled in the art as the following description proceeds, are attained by the improved process of this invention for producing an edible soy nut.

DETAILED DESCRIPTION OF THE INVENTION

Selected soybeans with their shells removed are washed in clean water at substantially room temperature. The washing may take place in a container or receptacle which, if desired, may be subjected to movement or agitation so as to thoroughly wash and clean the exteriors of each soybean. Subsequently, the water is drained from the soybeans, and the process is repeated until there is no remaining foreign matter on the soybeans or in the water.

The washed soybeans are then disposed in a suitable container or receptacle and covered with water, the depth of the water being in excess of the beans such that the beans remain totally immersed in the water. The water in which the soybeans are being soaked preferably has a temperature of 80°-55° F., more preferably 115°-120° F., in order to improve the soaking and expansion of the soybeans. The soybeans are allowed to soak in the water for a period of time to soften and expand the soybeans, preferably 1 to 20 hours, more preferably 2 to 12 hours. Typically, as the soybeans soak, they absorb water and expand to as much as 2 to 4 times their original size, such that the soaked soybeans comprise 10% to 80% by weight water. For example, if one (1) pound (or 2½ cups) of soybeans is soaked in five cups of 115°-120° F. water for 4 hours, after draining of water there would be 2.31 pounds (or 7 cups) of soybeans. After the soybeans have soaked for a suitable period of time, the soaked soybeans are then removed from the water, such as by draining the water from the receptacle containing the soybeans or otherwise.

The soaked soybeans are subsequently dried to remove a portion of the moisture from each of the soaked soybeans. Drying has been determined to be best effected by spreading the soaked soybeans on an absorbent (e.g. a turkish towel) and still air drying in ambient air at 60°-90° F. (preferably 72° F.). Such drying allows each soybean to be gradually dry, with immediate surface water being absorbed by the absorbent and residual water gradually evaporating off the outside surface of each bean as it reaches the outside surface of each soybean. The still air drying procedure typically takes 1 to 20 hours, more typically 6 to 10 hours, but does not remove all of the moisture or water from within each soybean. As will be discussed more comprehensively below, it is important to the present invention for producing a palatable, tasty, crisp and crunchy soy nut, that drying is indeed effected while leaving a residual, internal moisture content of as much as 1% to 40% by weight water within each soybean. Without drying and/or without a residual, internal moisture content, a tastier, crisper and crunchier soy nut can not be produced. Thus, while soaking the soybeans is important with respect to increasing the size of each soybean such that the moisture content of each soybean comprises 10% to 80% by weight water, drying is important to reduce the water content of the soybeans to 1% to 40% by weight.

It is to be understood that while the preferred method of drying the soybeans is the still air drying method that has been previously described, other methods for drying (e.g. blow drying, etc.) are within the spirit and scope of the present invention as long as the drying does not ultimately affect the texture and taste of the finally produced soy nuts. Obviously, some drying methods may have a tendency to start precooking or baking the soybeans which could ultimately affect the palatability, the taste, and the texture (i.e., crispness and/or crunchiness) of the soy nut.

When the soybeans have been dried, they are frozen which is preferably accomplished by disposing the dried soybeans into an airtight bag (e.g. a plastic bag sold under the trademark ZIPLOC), and placing the air tight bag containing the dried soybeans into a freezing atmosphere for a sufficient period of time to freeze the dried soybeans. Freezing is an important aspect of this invention if a tastier, crispier and crunchier soy nut is to be produced. If the dried soybeans are not frozen before further processing into soy nuts, the finally produced soy nuts contain generally indigestible oils, or other undesirable properties such as fatty cells, and are not crispy and crunchy.

When it is desired to produce the soy nuts of this invention, a hot oil bath having a temperature of from about 150° F. to about 500° F. (preferably about 365° F.) is initially prepared, and a selected quantity of the frozen soybeans are placed in the hot oil bath for heating or frying. It is important to stir the frozen soybeans immediately after placing them in the hot oil bath in order that the hot oil surrounds each soybean to evenly fry or cook each soybean, without any clustering or sticking together of soybeans that prevents the center mass of the clustered soybeans from being fried or cooked. The oil is preferably soy oil (or polyunsaturated vegetable oil) because it has been discovered that soy oil does not generally penetrate the soybean as it is being heated or fried in hot soy oil. Stated alternatively, as the soybeans are being heated or fried in hot soy oil or polyunsaturated vegetable oil (as opposed to other types of oils such as coconut, palm, or palm kernel oils, lard, beef tallow, etc.), the finally produced soy nuts have absorbed essentially none or very little of the soy oil such that the produced soy nuts possess essentially no oily taste.

As the frozen soybeans are being heated or fried in the hot oil bath, they pop and crack, indicating an explosive or expansive process caused by the residual moisture content of the soybeans leaving or egressing from the body or meat of the soybeans. Such exiting of the residual moisture causes soy oil to be driven from the meat or body structure. Stated alternatively, the immersing of the frozen soybeans in the hot soy oil causes the penetrated frozen residual moisture to gasify and to expand quickly, rendering the meat or body structure of the soybean readily frangible and thereby breaking down the oil cells and forcing the soy oil to the surface of the soybeans where it will be immediately absorbed in or admixed with the hot soy oil. The frozen residual moisture provides the necessary vehicle for driving out the soy oil without crushing or otherwise damaging the body texture of the soybeans. It has been discovered that unless the soybeans have been soaked, dried, and frozen in accordance with previously mentioned procedures, a substantial amount of internal soy oil is not forced or driven out of the respective soybeans as well as or with the same degree or intensity as that resulting from soaking, drying, and freezing; and the finally produced soy nuts would have an oily taste and would not be crispy and crunchy. Residual soy oil in soy nuts increases the possibility of the soy nuts becoming rancid. It is believed that if the soybeans have not been dried as indicated to lower the water saturation, the subsequent freezing of a non-dried, saturated soybean would cause the body or meat of the soybean to expand and damage the surface, skin, or shell of the soybeans into crevices or fissures which could allow soy oil to be absorbed by the body or meat of the soybean from the hot bath oil passing through the crevices or fissures during frying or heating, producing a soy nut with an oily taste. Furthermore, frying or heating non-dried, saturated soybeans increases the risk of a fire as too much moisture is being immersed in the hot oil bath.

The frozen soybeans are heated or fried in the hot oil bath until there is no longer any popping or cracking (typically 5 to 50 minutes), indicating substantially all of the residual moisture has been eliminated from the soybeans and, upon removing the fried soybeans from the hot oil bath, a soy nut is produced having a brownish color or roasted appearance, the color being evenly distributed throughout the body of the produced soy nuts. Immediately after there is no popping or cracking, the soy nuts should be removed from the hot oil bath to keep them from being overcooked, hard, scorched too brown or even black, and no longer palatable. The produced soy nut may be eaten in either a seasoned or unseasoned condition. If seasoned, the soy nuts should be seasoned with seasoned salt while still hot, for example, immediately after removing from the hot oil, in order for the seasoning salt to stay on the external surfaces or skin of the respective soy nuts. If the soy nuts are allowed to cool to room temperature (i.e., 60°–90° F.) prior to seasoning, it has been discovered that conventional seasoning salt will not remain adhered as well to the skin of the respective soy nuts. Preferably, seasoning salt is sprinkled liberally on the fried soybeans immediately after removing from the hot oil bath in order to season the produced soy nuts. Alternatively to immediately seasoning the produced soy nuts, the produced soy nuts may be processed further to produce other edibles or confections.

The soy nuts produced in accordance with this invention may be used to produce a popcorn confection. Four tablespoons of soy oil or other polyunsaturated vegetable oil are used to pop 1⅓ cups of popcorn. The popped corn is placed in a clean container, and about 0.50 pounds of unsalted (or unseasoned) soy nuts are commingled with the popped corn. Per each 0-0.50 pounds of soy nuts and 1⅓ cup of unpopped popcorn the following ingredients are added to a deep frying pan:

| | |
|---|---|
| Karo ® crystal clear syrup | .15–.55 lbs. |
| White sugar | .10–.30 lbs. |
| Brown sugar | .10–.30 lbs. |
| Soy margarine | .20–.80 lbs. |
| Vanilla | .004–.028 lbs. |
| Maple flavoring | .001–.009 lbs. |
| Salt | .0005–.0200 lbs. |

The above-listed ingredients are cooked to a soft ball stage (i.e., 175° F. to 280° F.), constantly stirring with a spoon. Pour the melted ingredients over the combined popcorn and soy nuts and subsequently mix well. Place the coated popcorn and soy nuts in a shallow pan and bake at 200° F. to 400° F. for 15 to 45 minutes. Remove from oven and stir the coated popcorn and soy nuts well, and replace in oven at 200° F. to 400° F. Allow to bake for another 15 to 45 minutes, and remove from oven, stirring well to break apart any of the cooked pieces that might be stuck together. After cooling, the popcorn confection is ready for packaging.

The soy nuts produced in accordance with this invention may be further used to produce a chocolate confection having per each 1 pound of unseasoned soy nuts 2 pounds of tempered real chocolate. Melting chocolate: Chocolate should be heated gently, always melting it over hot (not boiling) water rather than over direct heat. Heat water in the bottom of a double boiler. Remove from heat, place chocolate in top of double boiler, and stir to melt. It is important not to allow any water or milk to drip into the chocolate. If one lifts the top of the double boiler from the water, dry the base of the pan. Should a drop of water fall into the chocolate, dip it out with a spoon. Never stir water into the chocolate. If chocolate will not melt properly, chances are it is either old or has been exposed to moisture. In the latter case, stir one or two tablespoons of vegetable oil or paramount crystals into the chocolate.

Real milk chocolate: When dipping in real chocolate, tempering is necessary. Real chocolate that is not tempered properly will take a very long time to set up, and when it becomes firm, it will have white streaks and spots in it. If one thinks the chocolate is properly tempered, dip one center into the chocolate and wait a few minutes. If the chocolate was tempered properly, it will be set within a few minutes. If it does not set within ten minutes, or if it dries with white streaks in it, the tempering process should be repeated. Although the process of using real milk chocolate is somewhat involved, most real chocolate lovers will agree that the results are worth the extra effort.

Tempering chocolate: Tempering chocolate is simply melting, cooling, then bringing chocolate back to the proper dipping temperature. Tempering chocolate before dipping results in a shinier surface to dipped chocolates. Real chocolate must be tempered, although chocolate coatings can be tempered for shinier results. To temper chocolate properly, follow the following steps:

1. Bring water in the bottom of a double boiler to a boil and remove from heat.
2. Place chocolate in top of double boiler over hot water which is at a temperature of 170°-212° F. (the temperature of chocolate should not rise over 110° F.). Stir frequently until the chocolate is almost melted.
3. Replace hot water in double boiler with warm water (about 110° to 130° F.). Continue stirring until chocolate is melted.
4. Replace warm water with cool water (about 50°-70° F.). Stir until chocolate becomes very thick, like a thick frosting, and does not run from the spoon (about 78° for milk chocolate, 80° for dark chocolate). Do not allow chocolate to cool enough to solidify.
5. Replace cool water with tepid water (86°-90° F.). Stir to loosen chocolate. The chocolate requires time and constant stirring at this point to bring it back up to the proper temperature and consistency.
6. Milk chocolate must be quite thick when used.

The chocolate is now ready to add the soy nuts. Mix well. Keep the water temperature constant at 86°-90° F. Drop small amounts of chocolate covered soy nuts onto a cookie sheet for cooling. As soon as they are cool and solid, they are ready to be packaged.

The soy nuts produced in accordance with this invention may still yet further be used to produce a soy nut brittle. Per each 1 cup of unseasoned soy nuts, the following ingredients are added to a mixing container:

| Sugar | .20–.70 lbs. |
| Water | .05–.20 lbs. |
| Vanilla | .004–.30 lbs. |
| Karo ® corn syrup | .10–.70 lbs. |
| Salt | .0001–.0100 lbs. |
| Baking soda | .01–.30 lbs. |
| Soy margarine | .0001–.30 lbs. |

Initially dissolve sugar, syrup and water in container and cook 1 to 8 minutes while covered. Remove cover and cook to 100° F. to 300° F., say 1 to 10 minutes. Add the soy nuts and cook to 200° F. to 400° F., which takes approximately 1 to 10 minutes. Remove container from heat and subsequently add vanilla, salt, baking soda and soy margarine, stirring until well blended to produce melted soy nut brittle. Position defined volumes of the melted soy nut brittle on wax paper or cookie sheet to produce solidified soy nut brittle.

My invention will be illustrated by the following set forth examples which are given by way of illustration and not by any limitations. All parameters such as concentrations, mixing proportions, temperatures, ingredients, compounds, etc. submitted in these examples are not to be construed to unduly limit the scope of my invention. It is recognized that some tests applicable to human beings yield results which at best are merely qualitative results due to the subjective sensations of the human subjects, especially the sensation of taste. It is further recognized that subjective sensations may vary so substantially from individual to individual that it is difficult to delineate well defined, quantitative results. However, even though test results are evidence of subjective sensations, it is believed that they are still of objective value.

EXAMPLE I

A selected cluster of soybeans is washed, placed in a container, and covered with water and allowed to soak overnight, covered. The remaining water is removed from the overnight soaked soybeans, and the soaked soybeans are allowed to still air dry on a clean white turkish towel for 6 to 10 hours. The dried soybeans are spooned into a ZIPLOC ® plastic bag, sealed tightly, and placed in a freezing atmosphere to freeze. Approximately ½ gallon of soy oil is placed in a thermostatically controlled electric deep fryer having a basket, and the soy oil is heated to 375° F. The frozen dried soybeans are placed in the basket and immersed in the 375° F. soy oil bath. Immediately popping and cracking sounds are heard. The soybeans are allowed to remain immersed in the hot soy oil until the popping and cracking sounds can no longer be heard, which takes 20 to 22 minutes. The basket is lifted out of the hot soy oil and the fried soy beans are poured on a paper towel covered cookie sheet. Seasoned salt is liberally sprinkled over the fried soybeans while hot such that a palatable, tasty, crispy and crunchy edible soy nut is produced.

EXAMPLE II

Repeat Example I except that the freezing step is omitted, and discover that the produced soy nut edible has an oily taste and is generally not as tasty, crispy and crunchy as the edible soy nut of Example I.

EXAMPLE III

Repeat Example I except that the drying step is omitted, and discover that the produed soy nut edible is generally not as tasty, crispy, and crunchy as the edible soy nut of Example I.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

I claim:

1. A process for making soybeans palatable and readily digestible, comprising the steps of:
    (a) soaking soybeans in water until the soybeans comprise 10% to 80% by weight water;
    (b) removing the soaked soybeans of step (a) from the water;
    (c) drying the removed soybeans of step (b) until the soybeans comprise 1% to 40% by weight water;
    (d) freezing the dried soybeans of step (c);
    (e) disposing the frozen soybeans of step (d) in a hot oil bath having a temperature of from about 150° F. to about 500° F. to heat the frozen soybeans and cause the soybeans to start popping and cracking;
    (f) heating continually the soybeans until the soybeans have stopped popping and cracking;
    (g) removing the heated soybeans from the hot oil bath.

2. The process of claim 1 wherein said drying step (c) comprises still air drying the soybeans in still air at room temperature for at least 2 hours.

3. The process of claim 1 wherein said hot oil bath is hot soy oil.

4. The process of claim 1 additionally comprising seasoning the outside of the removed heated soybeans of step (g) while the removed soybeans are hot and before the removed soybeans have cooled.

5. The process of claim 1 wherein said disposing step (e) is from 5 to 50 minutes.

6. The process of claim 1 additionally comprising admixing the produced soybean with chocolate.

7. The process of claim 1 additionally comprising admixing the produced soybean with popped popcorn and coating the mixture with ingredients comprising syrup, sugar, margarine, vanilla, salt, and maple flavoring.

8. The process of claim 1 additionally comprising admixing the produced soybean with a mixture comprising syrup to produce a brittle candy.

9. The process of claim 1 wherein said water in step (a) has a temperature of from about 80° F. to 155° F.

10. The process of claim 10 wherein said chocolate has been tempered.

11. A process for making soybeans palatable and readily digestible, comprising the steps of:
    (a) soaking soybeans in water having a temperature of from 80° F. to 155° F., said soaking being from 1 to 20 hours and until said soybeans comprise 10% to 80% by weight water;
    (b) removing the soaked soybeans of step (a) from the water;
    (c) drying the removed soybeans of step (b) from 1 to 20 hours and until said soybeans comprise 1% to 40% by weight water;
    (d) freezing the dried soybeans of step (c);
    (e) disposing the frozen soybeans of step (d) in a hot oil bath having a temperature of from about 150° F. to about 500° F. to heat the frozen soybeans and cause the soybeans to start popping and cracking;
    (f) stirring said frozen soybeans immediately after said disposing step (e) in order that the hot oil surrounds each soybean;
    (g) continuing to heat the soybeans for 5 minutes to 50 minutes after said disposing step (e) and until the soybeans have stopped popping and cracking; and
    (h) removing the heated soybeans of step (g) from the hot oil bath.

12. The process of claim 11 wherein said drying step (c) comprises drying the removed soybeans in still air at room temperature.

13. The process of claim 11 additionally comprising admixing the produced soybeans with chocolate.

14. The process of claim 13 wherein said chocolate has been tempered.

15. The process of claim 11 additionally comprising admixing the removed soybeans with popped popcorn and coating the mixture with ingredients comprising syrup, sugar, margarine, vanilla, salt, and maple flavoring.

16. The process of claim 11 additionally comprising admixing the removed soybeans with a mixture comprising syrup to produce a brittle candy.

17. A process for making soybeans palatable and readily digestible, comprising the steps of:
    (a) soaking soybeans in water from 1 to 20 hours;
    (b) removing the soaked soybeans of step (a) from the water;
    (c) drying the removed soybeans of step (b) from 1 to 20 hours;
    (d) freezing the dried soybeans of step (c) until the dried soybeans are frozen;
    (e) disposing the frozen soybeans of step (d) in a hot oil bath from 5 to 50 minutes to heat the frozen soybeans, said hot oil bath having a temperature of from about 150° F. to about 500° F.;
    (f) removing the heated soybeans from the hot oil bath.

* * * * *